United States Patent
Bailey et al.

(10) Patent No.: US 6,558,641 B1
(45) Date of Patent: May 6, 2003

(54) ABSORBENTS

(75) Inventors: Stephen Bailey, Richmond (GB); Brian P Williams, Clitheroe (GB); Sebastien Grizard, Cleveland (GB); Robert Wilson, Cleveland (GB); Mark S Doran, Cleveland (GB)

(73) Assignee: Imperial Chemical Industries Plc, London (GB)

( * ) Notice: Subject to any disclaimer, the term of this patent is extended or adjusted under 35 U.S.C. 154(b) by 104 days.

(21) Appl. No.: 09/633,115

(22) Filed: Aug. 4, 2000

Related U.S. Application Data

(63) Continuation of application No. PCT/GB99/00365, filed on Feb. 3, 1999.

(30) Foreign Application Priority Data

Feb. 6, 1998 (GB) .............................................. 9802439

(51) Int. Cl.$^7$ ................................................ B01J 20/00
(52) U.S. Cl. ................ 423/240 R; 502/415; 423/240 S
(58) Field of Search ........................ 423/240 R, 240 S, 423/491, 499.1, 503; 502/84, 414, 415

(56) References Cited

U.S. PATENT DOCUMENTS 3,935,295 A    1/1976   La Hue et al. ............. 423/240
4,977,123 A  * 12/1990  Flytzani-Stephanopoulos et al. ............................................................... 502/84

FOREIGN PATENT DOCUMENTS

| EP | 0546464 A1 | 6/1993 |
| EP | 09225296 | 9/1997 |
| GB | 2267096 A | 11/1993 |
| WO | WO9522403 | 8/1995 |

OTHER PUBLICATIONS

Dantsig; Absorbent prodn. for sulphur cpds.; Derwent Publications; Aug. 7, 1987; p. 4, AN–88–075922.
Landukh; Remove Chlorine Waste Natural Gas; Derwent Publications; Oct. 30, 1980, AN–81–51190D.

* cited by examiner

Primary Examiner—Wayne A. Langel
Assistant Examiner—Jonas N. Strickland
(74) Attorney, Agent, or Firm—Pillsbury Winthrop LLP

(57) ABSTRACT

Shaped absorbent units suitable for use as chloride absorbents comprising a calcined intimate mixture of an alkali or alkaline earth, zinc and aluminium components having an alkali or alkaline earth mental to zinc atomic ratio in the range 0.5x to 2.5x and an alkali or alkaline earth metal to aluminium atomic ratio in the range 0.5x to 1.5x, where x is the valency of the alkali or alkaline earth metal, and containing from 5 to 20% by weight of a binder. Preferred compositions are made from sodium carbonate or bicarbonate, basic zinc carbonate or zinc oxide and alumina or hydrated alumina.

6 Claims, No Drawings

ABSORBENTS

This is a continuation of PCT International Application Number PCT/GB99/00365, filed Feb. 3, 1999, designating the United States, and published in the English language.

This invention relates to absorbents, and to a process for their manufacture, in particular to absorbents suitable for removing halogen-containing contaminants such as hydrogen chloride or chlorine-containing organic compounds from gas streams.

Such absorbents are typically employed as a bed through which the gas stream to be treated is continuously passed: the contaminant is absorbed by the absorbent so that the effluent gas has a relatively low contaminant content. After a period of time, the absorbent becomes loaded with absorbed contaminant until the absorbent bed is unable to reduce the contaminant content to an acceptable level: typically it is desired to have an effluent gas containing less than a specified amount, e.g. 0.1 ppm by volume, of contaminant. When the effluent gas contains an unacceptable proportion of contaminant, "break-through" is said to have occurred. It is normally found that, when break-through has occurred, the halide content of the bed is somewhat less than the theoretical maximum: thus while samples taken from bed inlet region may have a halogen content approaching the theoretical maximum, samples taken from the bed outlet region are liable to have a halogen content significantly below the theoretical maximum.

Sodium and zinc compounds are effective absorbents for halogen-containing compounds. It has been proposed in U.S. Pat. No. 3,935,295 to make absorbents from a composition comprising zinc oxide, a basic calcium compound and a binder. It has also been proposed in WO95/22403 to make absorbents by granulating a mixture of sodium carbonate, or bicarbonate, alumina trihydrate, and a binder followed by calcination at below 350° C. While such absorbents have a high halogen absorption capacity at low temperatures, e.g. below 150° C., at higher temperatures the absorption capacity decreases as a result of decomposition of the active species in the absorbent. It is thus desirable to produce an absorbent that is effective both at temperatures below 150° C. and at higher temperatures, e.g. up to 300° C.

We have found that particularly effective absorbents can be made from a combination of alkali metal, and/or alkaline earth metal and zinc compounds.

Accordingly the present invention provides shaped absorbent units comprising a calcined intimate mixture of a) an alumina component selected from alumina and/or hydrated alumina, b) a zinc component and a basic metal component, said components being oxides, hydroxides, carbonates, bicarbonates and/or basic carbonates and said basic metal component comprising at least one compound of at least one alkali or alkaline earth metal, and c) a binder, the basic metal to zinc atomic ratio being in the range 0.5x to 2.5x and the basic metal to aluminium atomic ratio being in the range 0.5x to 1.5x where x is the valency of the basic metal, said granules containing from 5 to 20% by weight of said binder.

Preferably the shaped units have a basic metal content such that, after ignition of a sample of the units at 900° C., the sample has a basic metal oxide content of at least 10%, particularly at least 15%, and more particularly at least 20%, by weight.

Basic metal compounds that may be employed include compounds of lithium, sodium, potassium, beryllium, magnesium, calcium, strontium and barium. Preferred compounds are compounds of sodium or calcium, particularly sodium. Particularly preferred alkali or alkaline earth compounds are carbonates and/or bicarbonates. Where an alkali metal compound is used "x"=1. Mixtures of alkali metal and alkaline earth metal compounds may be used: in this case the value of "x" will depend on the relative atomic proportions of alkali metal and alkaline earth metal.

The zinc component is preferably zinc oxide, carbonate or, particularly, basic carbonate. The basic metal and zinc components may be present at least partially as a mixed salt, such as sodium zinc carbonate and/or basic sodium zinc carbonate.

The shaped absorbent units preferably have an average size in the range 2–10 mm, and preferably at least about 3 mm as a bed of smaller units is liable to present an unacceptable resistance to flow of gas therethrough. Thus an unacceptably high pressure drop is experienced upon passage of the gas through a bed of small units.

The binder may be a suitable hydraulic cement, such as calcium aluminate cement. Alternatively, and preferably, the binder comprises a clay, for example an acicular clay such as attapulgite or sepiolite.

The shaped absorbent units of the present invention may be made by granulating or extruding a mixture of alumina or a hydrated alumina such as alumina trihydrate, basic metal component, zinc component and the binder, in the requisite proportions, and calcining the resultant mixture. Preferably the units are made from a mixture of hydrated alumina, sodium bicarbonate, zinc oxide or basic zinc carbonate, and a clay binder.

Alternatively there may be used a preformed mixed basic metal/zinc salt, e.g. sodium zinc carbonate or basic sodium zinc carbonate, e.g. as obtained by precipitation by the dropwise addition of a solution of sodium carbonate with a solution of a zinc compound such as zinc nitrate under controlled conditions of pH in the range 7–8 and temperature of about 80° C., alone, or in admixture with additional zinc and/or sodium carbonates. This mixed basic metal/zinc salt may be mixed with the alumina or hydrated alumina and binder to form the shaped absorbent units.

Where hydrated alumina is used as the alumina component, the calcination results in a substantial increase in the surface area of the absorbents. For these reasons the calcination is preferably effected at temperatures in the range 200–450° C., particularly above 240° C., and most preferably above 300° C. Preferably the calcination temperature is below 500° C. to minimise reaction of the basic metal compound and the alumina: thus alkali or alkaline earth metal aluminates have lower absorption capacity.

The shaped absorbent units preferably have a BET surface area of at least 10 $m^2/g$, particularly above 50 $m^2/g$, and most preferably above 90 $m^2/g$.

By the term granulation we mean mixing the powdered ingredients, including the binder, with a little wetting agent such as water, in an amount that is insufficient to form a slurry, and forming the resultant mixture into aggregates, generally of approximate spherical configuration. Such granulation techniques are well known in the art.

As an alternative to granulation, the composition may be formed into extrudates, for example using a pellet mill, for example of the type used for pelleting animal feedstuffs, wherein the mixture to be pelleted is charged to a rotating perforate cylinder through the perforations of which the mixture is forced by a bar or roller within the cylinder. The resulting extruded mixture is cut from the surface of the rotating cylinder by a doctor knife positioned to give pellets of the desired length. It will be appreciated that other extrusion techniques may be employed.

It is preferred to employ alumina trihydrate, rather than alumina, since granulation or extrusion of alumina-containing compositions tends to present difficulties.

In order to make shaped units of adequate strength it is desirable to employ the ingredients in a finely divided form. Typically the ingredients have an average particle size in the range 1–20 μm, preferably in the range 5–10 μm.

Where an alkali metal compound is used, during the calcination step, it is believed that there is formed a highly dispersed alkali metal/zinc composite, probably an intimate mixture of alkali metal carbonate and zinc oxide, that is uniformly distributed over the alumina substrate. It appears that while zinc oxide is an effective chloride absorbent, alkali metal carbonates are less effective. For this reason the alkali metal to zinc atomic ratio of the granules should be below 2.5. When employing sodium compounds as the alkali metal component and the absorbent is used for absorption of hydrogen chloride, we have observed that a sodium zinc chloride $Na_2ZnCl_4$ is formed: this species has been identified by X-ray diffractometry on absorbents that have been used for absorption of hydrogen chloride. It is evident by the dry, free-flowing nature of the fully chlorided shaped absorbent units that the formation of this compound does not give rise to any of the deleterious effects associated with moisture absorption such as caking, pressure drop, and difficulties in discharge of spent absorbent. However, if the alkali metal to zinc ratio of the absorbent is too small, the granules become sticky during use, giving rise to caking of a the bed of absorbent units with the consequence of the bed exhibiting an unacceptable increase in the resistance of gas flow therethrough. For this reason the alkali metal to zinc atomic ratio should preferably be above 0.8. It is preferred that the alkali metal to zinc atomic ratio is in the range from about 0.8 to 22.

The absorbent granules of the invention may be used at temperatures ranging from 10 to 300° C. and at any convenient pressure, for example atmospheric to 100 bar abs. They are of particular utility as guard beds to absorb chloride ions from gas streams, e.g. to avoid corrosion problems during subsequent processing of the gas stream and/or to avoid poisoning of downstream catalysts, particularly copper containing catalysts such as low temperature shift catalysts or methanol synthesis catalysts. Thus the granules may be disposed as a bed adjacent the inlet of a bed of low temperature shift or methanol synthesis catalyst. They may also be of utility in removing halogen-containing organic compounds from gas streams.

The Invention is illustrated by the following examples.

EXAMPLES 1–5

Alumina trihydrate, basic zinc carbonate (hydrozincite —$Zn_5(CO_3)_2(OH)_6$), sodium carbonate, and a clay binder, each in finely divided powder form having an average particle size in the range 5–10 μm, were dry mixed in the proportions specified in the table below. Part of the mixture (about 3 kg) was charged to a Hobart mixer of 15 l capacity and stirred therein. Water was slowly added while stirring until the mixture adhered to form small balls or agglomerates. Further amounts of the powder mixture and water were gradually added until all the powder mixture had formed into agglomerates. The agglomerates were then sieved to reject agglomerates having a size below about 2.8 mm or above about 4.8 mm.

The remaining agglomerates were then calcined in air at 300° C. for 2 hrs.

The hydrogen chloride absorption characteristics were assessed by passing hydrogen containing about 1% by volume of hydrogen chloride at atmospheric pressure and ambient temperature (20–25° C.) down through a vertical bed of the pellets or granules of height 16 cm and height to diameter ratio of 7 at a space velocity of approximately 750 $h^{-1}$. The time taken before the hydrogen chloride content of the exit gas reached 5 ppm by volume was determined and is quoted in the following table as the "break-through time to 5 ppm HCl". The granules were then carefully discharged from the bed and divided into 6 portions corresponding to 2.5 cm bands of the bed depth. Each portion was analysed for the chloride content. The results are shown in the following table:

|  |  | Example | | | | |
|---|---|---|---|---|---|---|
|  |  | 1 | 2 | 3 | 4 | 5 |
| composition (parts by weight) | Al(OH)$_3$ | 40 | 40 | 40 | 40 | 40 |
|  | Na$_2$CO$_3$ | 20 | 25 | 30 | 35 | 40 |
|  | Zn$_5$(CO$_3$)$_2$(OH)$_6$)$_1$ | 40 | 35 | 30 | 25 | 20 |
|  | binder | 7 | 7 | 7 | 7 | 7 |
|  | Na/Zn atomic ratio | 1.0 | 1.5 | 2.1 | 2.9 | 4.1 |
|  | Na/Al atomic ratio | 0.7 | 0.9 | 1.1 | 1.3 | 1.5 |
| Break-through time (hh:mm) to 5 ppm HCl |  | 13:00 | 11:00 | 13:30 | 6:15 | <3:00 |
| Chlorine content (% by weight of discharged absorbent) | Bed portion 1 (top) | 21.8 | 19.2 | 21.7 | 11.4 | 5.3 |
|  | Bed portion 2 | 22.5 | 19.6 | 20.2 | 11.3 | 5.1 |
|  | Bed portion 3 | nm | nm | 19.1 | nm | nm |
|  | Bed portion 4 | nm | nm | 19.6 | nm | nm |
|  | Bed portion 5 | nm | nm | 18.2 | nm | nm |
|  | Bed portion 6 (bottom) | nm | nm | 4.3 | nm | nm | nm = not measured

It is seen that the absorbtion capacity deteriorates if the sodium to zinc ratio is too high.

EXAMPLE 6

Example 3 was repeated but using different calcination temperatures. The BET surface area of the absorbent units was determined and was as set out in the following table.

| Calcination temperature (° C.) | BET surface area (m²/g) |
| --- | --- |
| none | 12 |
| 200 | 17 |
| 250 | 57 |
| 300 | 103 |
| 350 | 99 |
| 400 | 95 |

EXAMPLE 7

Extrudates were made using the ingredients as employed for Example 3 by dry-mixing the powdered ingredients in a Kenwood mixer. The total weight of the dry ingredients used was 1000 g. 200 ml of distilled water was added and mixed in small aliquots to form a homogeneous mixture. The resulting paste was then extruded in a small pellet mill to give extrudates of 3.2 mm diameter and about 6 mm long. The wet extrudates were calcined at 300° C. for 2 hours. The procedure was repeated using 250 ml of water giving a greater yield of extrudates of the requisite size. The procedure was also repeated using 2000 g of the dry mixture and 550 ml of water and using a pellet mill giving extrudates of 2 mm diameter and length about 5 mm. The yield of pellets of the requisite size and their properties are shown in the following table.

| Feed weight (g) | Water (ml) | Weight of calcined product (g) | Bulk density (g/l) | BET surface area (m²/g) |
| --- | --- | --- | --- | --- |
| 1000 | 200 | 371 | — | 89 |
| 1000 | 250 | 439 | 800 | — |
| 2000 | 550 | 1540 | 760 | 74 |

(The bulk density is the density of a bed of the extrudates).

The chloride contents of the extrudates when tested by the procedure employed in examples 1–5 were in the range 12.7–14.7% by weight.

EXAMPLE 8

The material of Example 3 (hereinafter absorbent A) was tested as above but using a hydrogen chloride concentration of 0.1% by volume instead of 1%. The chlorine contents of the discharged portions of the bed were as follows:

| | Chlorine content (% by weight of discharged absorbent) |
| --- | --- |
| Bed portion 1 (top) | 20.9 |
| Bed portion 2 | 20.4 |
| Bed portion 3 | 20.1 |
| Bed portion 4 | 20.6 |
| Bed portion 5 | 20.2 |
| Bed portion 6 (bottom) | 8.5 |

EXAMPLE 9

Absorbent A was tested as above using a hydrogen chloride concentration of 1% by volume but at differing temperatures. Since the space velocity (at NTP) was kept constant at 750 h$^{-1}$, the contact time of the gas with the bed of absorbent units decreases as the temperature increases. The approximate contact time and chlorine content of the top bed was as follows:

| Test temperature (° C.) | Approximate contact time (sec) | Chlorine content (% by weight of discharged absorbent) |
| --- | --- | --- |
| 25 | 4.8 | 20.0 |
| 50 | 4.3 | 19.7 |
| 100 | 3.8 | 19.0 |
| 200 | 3.0 | 16.1 |
| 300 | 2.5 | 11.9 |

EXAMPLE 10

A number of absorbents were tested for hydrogen chloride absorption using 500 ml of the absorbent units disposed as a bed of height 45 cm and diameter 4 cm using a gas mixture of 80% by volume hydrogen and 20% natural gas containing 50 ppm by volume of hydrogen chloride at a space velocity of 1756 h$^{-1}$ at a temperature of 35° C. and a pressure of 20 barg. The absorbents used were as follows:

Absorbent A: (as described above)

Absorbent B: Granules of particle size within the range 3 to 5 mm having a bulk density of about 0.9 g/ml and a BET surface area of about 16 g/m² made by the procedure of Example 1 of WO 95/22403 using 50 parts by weight of sodium bicarbonate, 50 parts by weight of alumina trihydrate, and 10 parts by weight of attapulgite clay with the drying and calcining being effected in a single stage in a rotary drier at 145° C. Analysis of a sample of the granules that had been ignited at 900° C. showed a sodium oxide, $Na_2O$, content of about 30% by weight.

Absorbent C: Commercially available alumina granules of about 3 mm size impregnated with sodium carbonate and calcined at above 500° C. to give granules of bulk density about 0.75 g/ml and a BET surface area of about 113 m²/g which, after ignition at 900° C., had a sodium oxide, $Na_2O$, content of about 14% by weight Absorbent D: Commercially available activated alumina granules of about 3 mm size having a bulk density of 0.83 g/ml and a BET surface area of about 300 m²/g.

The results are shown in the following table

| | Chlorine content of discharged absorbent (% by weight) | | | | | |
| --- | --- | --- | --- | --- | --- | --- |
| Absorbent | Bed 1 | Bed 2 | Bed 3 | Bed 4 | Bed 5 | Bed 6 |
| A | 28.0 | 27.9 | 26.6 | 23.4 | 18.8 | 7.6 |
| B | 21.3 | 19.9 | 19.7 | 18.2 | 14.8 | 6.6 |
| C | 14.2 | 12.8 | 12.5 | 12.4 | 10.8 | 6.8 |
| D | 8.8 | 7.5 | 6.7 | 5.5 | 5.5 | 4.4 |

EXAMPLE 11

30 parts by weight of alumina trihydrate, 35 parts by weight of sodium bicarbonate, 35 parts by weight of zinc oxide and 7 parts by weight of a clay binder, each in finely divided powder form having an average particle size in the range 5–10 μm, were dry mixed, granulated, dried and calcined, by the procedure described in Examples 1–5. The sodium to zinc atomic ratio was about 1.0 and the sodium to aluminium atomic ratio was about 1.1. The BET surface area of the absorbent granules was 95 m²/g. The resulting agglomerates were then tested for hydrogen chloride absorption by the procedure described in Examples 1–5. The break-through time was 14:55 (hh:mm) and the chloride content of the top portion of the absorbent bed was 32.3% by weight.

When a calcium aluminate cement was used in place of the clay as the binder, lower chloride absorption was achieved.

Granules made by a similar procedure but with sodium to zinc ratios below 0.8 became sticky and formed into a solid lump during the chloride absorbency test.

EXAMPLE 12

The procedure of Example 11 was repeated using basic zinc carbonate in place of zinc oxide and 10 parts of the clay binder. The resultant absorbent was designated Absorbent E and had a sodium to zinc atomic ratio of 1.3 and a sodium to aluminium atomic ratio of 1.1. Absorbents E, B and C were tested for their ability to absorb chlorine-containing organic compounds by passing hydrogen containing about 1% by volume of 1,2 dichloropropane at atmospheric pressure and ambient temperature (20–25° C.) down through a vertical bed of the absorbent of height 16 cm and height to diameter ratio of 7 at a space velocity of approximately 750 h$^{-1}$. The bed inlet and outlet 1,2 dichloropropane concentrations were monitored over a period of time and the ratio of the outlet to inlet concentrations used to give an indication of the performance of the absorbent. The results are shown in the following table.

| Time (min) | 1,2 dichloropropane concentration: outlet/inlet (%) | | |
|---|---|---|---|
| | Absorbent B | Absorbent C | Absorbent E |
| 0 | 0 | 0 | 0 |
| 30 | 50 | 5 | 2 |
| 60 | 71 | 42 | 3 |
| 90 | 92 | 76 | 5 |
| 120 | 100 | 93 | 11 |
| 150 | | 100 | 86 |
| 180 | | | 93 |
| 210 | | | 100 |

It is seen that the absorbent in accordance with the invention, vie. absorbent E, was far more effective in absorbing 1,2-dichloropropane than the prior art absorbents.

When tested for hydrogen chloride absorption capacity by the procedure employed in Examples 1–5, the absorbent E gave a performance very similar to the absorbent of Example 11; the chloride content of the portion of the absorbent bed at hydrogen chloride breakthrough was 32.5% by weight.

What is claimed is:

1. Shaped absorbent units comprising a calcined intimate mixture consisting essentially of
    a) an alumina component selected from the group consisting of alumina and hydrated alumina,
    b) a zinc component and an alkali metal component, said zinc component and said alkali metal component being selected from the group consisting of oxides, hydroxides, carbonates, bicarbonates, and basic carbonates, and
    c) a binder,
   the alkali metal to zinc atomic ratio being in the range 0.8 to 2.5 and the alkali metal to aluminum atomic ratio being in the range 0.5 to 1.5, and said shaped units containing from 5 to 20% by weight of said binder.

2. Shaped absorbent units according to claim 1 having an alkali metal content such that, after ignition of a sample of the shaped units at 900° C., the sample has a alkali metal oxide content of at least 15% by weight.

3. Shaped absorbent units according to claim 1 having a BET surface area above 50 m²/g.

4. Shaped absorbent units according to claim 1 wherein the alkali metal to zinc atomic ratio is in the range from 0.8 to 2.2.

5. A process for the manufacture of shaped absorbent units comprising forming granules or extrudates from a mixture consisting essentially of (i) alumina trihydrate, (ii) an alkali metal carbonate or bicarbonate, (iii) basic zinc carbonate or zinc oxide, and (iv) a binder in such proportions that the alkali metal to zinc atomic ratio is in the range 0.8 to 2.5, the alkali metal to aluminum atomic ratio is in the range 0.5 to 1.5, and the binder forms from 5 to 20% by weight of the granules or extrudates, and then calcining the granules or extrudates at a temperature in the range 200 to 450° C.

6. A process for the removal of halogen-containing contaminants from a gas stream, comprising passing the gas stream through a bed of shaped absorbent units of a calcined intimate mixture consisting essentially of
    a) an alumina component selected from the group consisting of alumina and hydrated alumina,
    b) a zinc component and an alkali metal component, said zinc component and said alkali metal component being selected from the group consisting of oxides, hydroxides, carbonates, bicarbonates, and basic carbonates, and
    c) a binder,
   the alkali metal to zinc atomic ratio being in the range 0.8 to 2.5 and the alkali metal to aluminum atomic ratio being in the range 0.5 to 1.5, and said shaped units containing from 5 to 20% by weight of said binder.

* * * * *